Dec. 18, 1962  J. J. SANTAMARIA ETAL  3,068,647
PROPULSION AND CONTROL SYSTEM FOR MULTI-ENGINE
TURBINE POWERED AIRCRAFT
Filed March 23, 1960   5 Sheets-Sheet 1
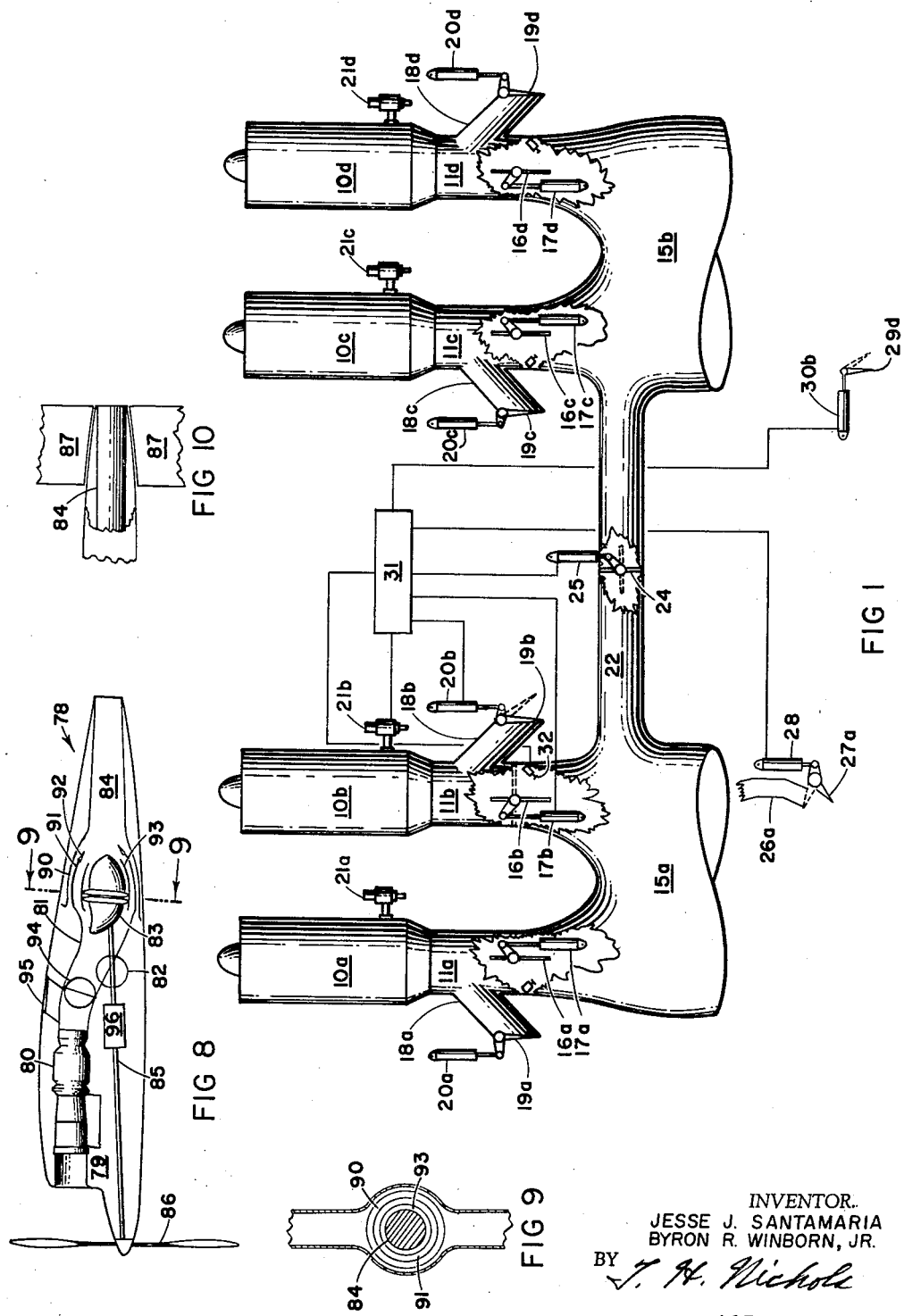
INVENTOR..
JESSE J. SANTAMARIA
BYRON R. WINBORN, JR.
BY
AGENT

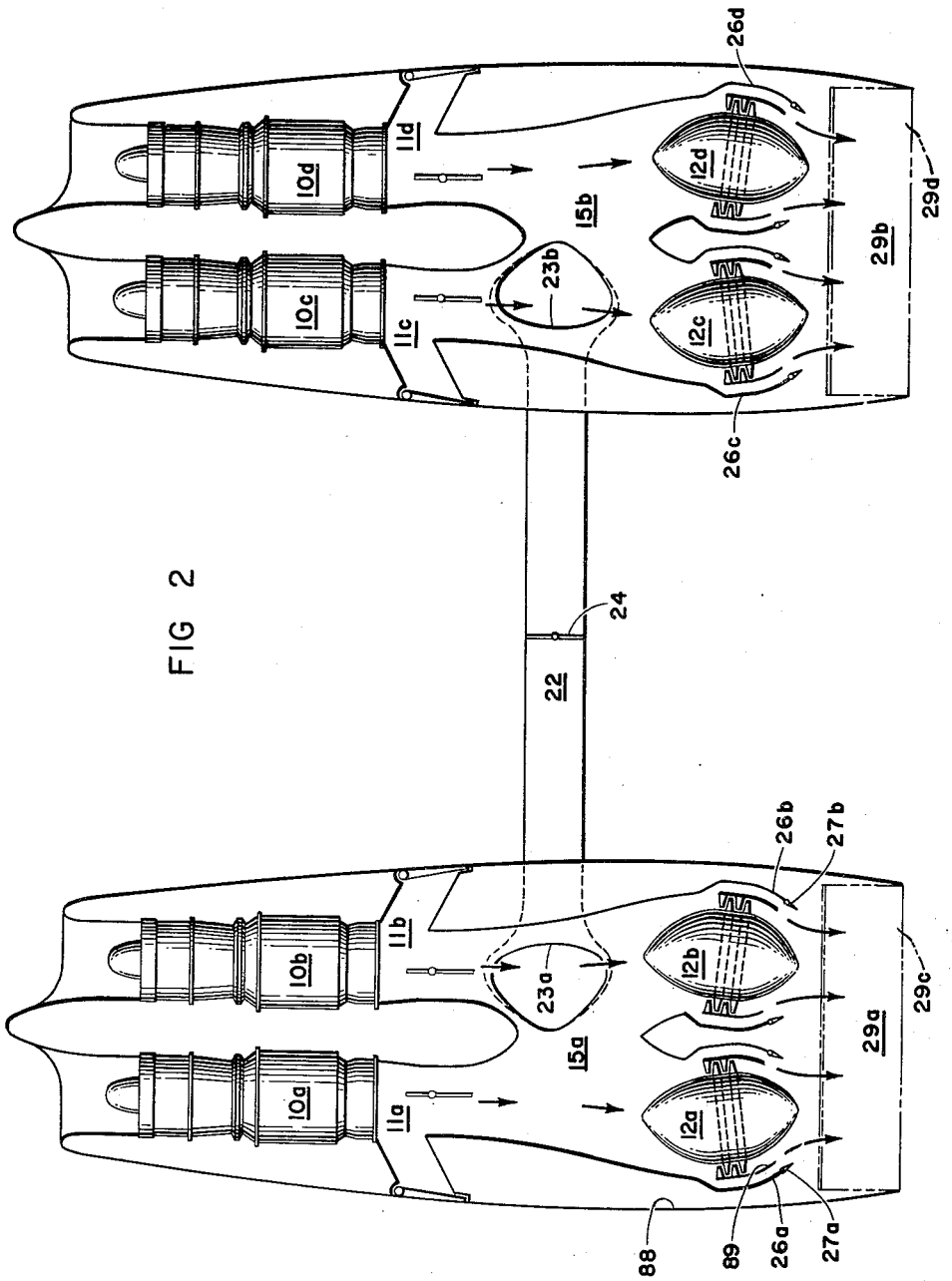

Dec. 18, 1962 J. J. SANTAMARIA ETAL 3,068,647
PROPULSION AND CONTROL SYSTEM FOR MULTI-ENGINE
TURBINE POWERED AIRCRAFT
Filed March 23, 1960 5 Sheets-Sheet 3
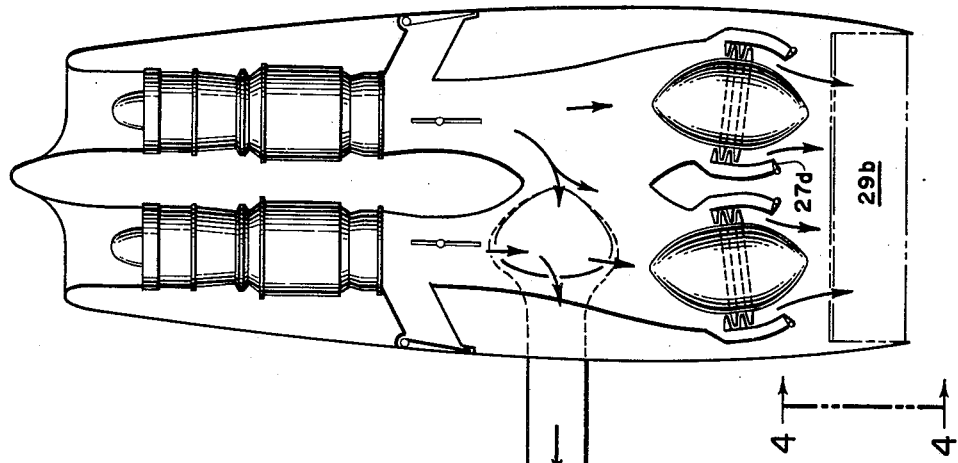
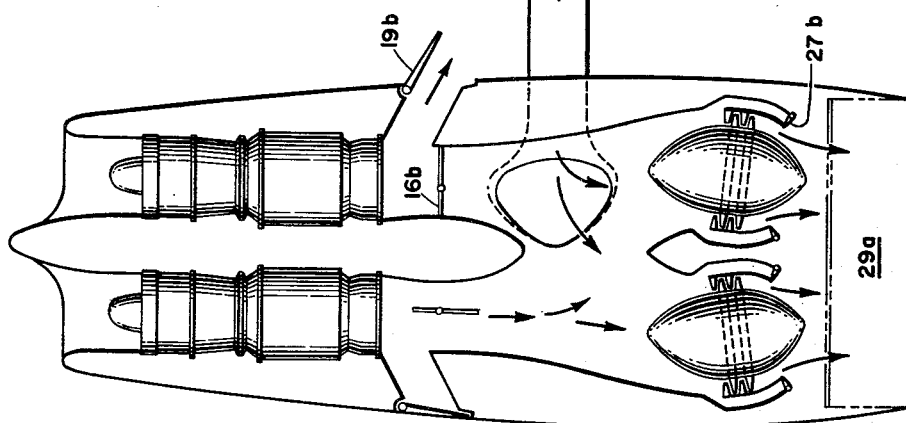
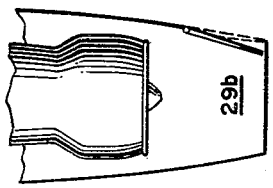
INVENTOR.
JESSE J. SANTAMARIA
BYRON R. WINBORN, JR.
BY
*J. H. Nichols*
AGENT

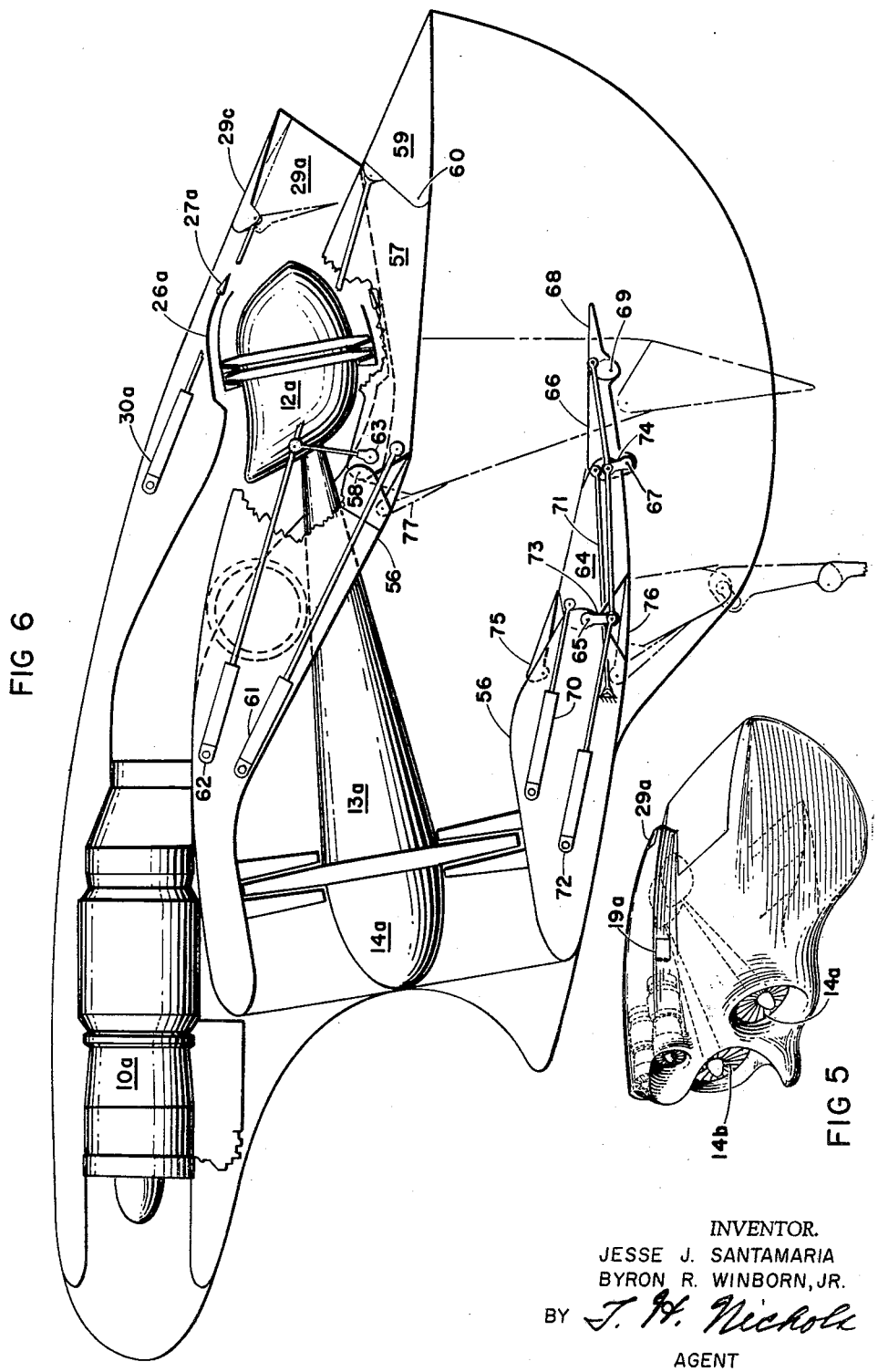

3,068,647
Patented Dec. 18, 1962

3,068,647
PROPULSION AND CONTROL SYSTEM FOR MULTI-ENGINE TURBINE POWERED AIRCRAFT
Jesse J. Santamaria, Dallas, and Byron R. Winborn, Jr., Irving, Tex., assignors, by mesne assignments, to Ling-Temco-Vought, Inc., Dallas, Tex., a corporation of Delaware
Filed Mar. 23, 1960, Ser. No. 16,987
10 Claims. (Cl. 60—39.25)

This invention pertains to a gas propulsion and control system for multi-engine turboprop and turbofan propelled aircraft.

More specifically, this invention comprises a new method for maintaining a minimum loss of thrust due to an engine failure in a multi-turboprop or turbofan propelled aircraft and more than one apparatus for carrying out the new method.

Herebefore in aircraft having a multiplicity of power plants, when one power plant fails, the aircraft immediately is in a precarious situation due to momentary loss of precise control, particularly during take-offs or landings, until the engine in trouble can be shut down and trim tabs on the control surfaces adjusted to maintain the aircraft in straight and level flight. In a four engine aircraft for example, loss of one engine lowers the total power to 75% of the original power, causing a great amount of compensation for loss of power and control with the immediately addition of increased parasite drag due to unbalance and change in direction of the line of thrust.

A principal object of this invention is to provide a good, reliable, and economical method of emergency control for a multi-engine aircraft wherein less loss of power and control is provided upon failure of one engine.

Another principal object is to provide a propulsion and control system for maintaining a minimum loss of thrust due to loss of an engine in a multi-jet engine aircraft.

Another object of this invention is to provide an aircraft propulsion and control system employing a plurality of turbines matched to a plurality of gas generators with the addition of one gas generator whereby little loss in thrust results with failure of one of the generators.

Another object of this invention is to provide a propulsion and control system for either a turboprop or a turbofan propelled four engine aircraft for equalizing the hot gas exhaust for providing substantially only a 12% loss of propulsive thrust instead of the usual 25% loss of thrust with one engine out.

A further object of this invention is to provide a power pack adapted to be attached to the side of a multi-engine aircraft as one of its propulsion means and which propulsion means may be controlled with great accuracy and economy, particularly after loss of an engine.

A still further object of this invention is to provide a hot gas propulsion and control system for both multi-engine turboprop and turbofan propelled aircraft having a plurality of fans, and a plurality of gas generators, the capacity of the generators being such that upon failure of one gas generator, the generated gases of the remaining generators are sufficient to drive the fans and accordingly the gases are ducted to the fans with only a very low loss of total thrust.

Other objects and various advantages of the disclosed method and several propulsion systems for providing emergency control in a multi-engine propelled aircraft will be apparent from the following detailed description, together with the accompanying drawings, submitted for purposes of illustration only and not intended to define the scope of the invention, reference being had for that purpose to the subjoined claims.

Briefly, this invention comprises a method for maintaining a minimum loss of thrust due to failure of an engine in a three or more gas generator turboprop or turbofan propelled aircraft, and at least one apparatus for carrying out the new method. The method comprises matching a number of gas generators to the power turbines and adding one gas generator to the propulsion system, and upon loss of a generator, equally distributing the exhaust flow from the remaining operative engines to all propulsive fans without the usual high thrust loss due to loss of one engine. An exemplary apparatus for carrying out the novel method comprises two interconnected power packs, each pack comprising two hot gas generators, a portion of the exhaust from each generator rotating a turbine for driving a fan for propelling the aircraft, an interconnecting cross duct, and valves on all exhaust ducts for all generators for equally distributing the exhaust gas flow to the propelling fans upon failure of a gas generator. Likewise, a similar turboprop-jet version is disclosed.

FIG. 1 is a schematic plan view of a hot gas propulsion and control system per se, with parts cutaway, showing the gas generators or jet engines and the accompanying ducting of the system as they would appear exclusively of the rest of the power pack and the aircraft in which they are mounted;

FIG. 2 is a detailed cross sectional view of the system of FIG. 1 showing additional parts of the system including two power packs;

FIG. 3 is the system of FIG. 2 with one gas generator inoperative;

FIG. 4 is a view taken at 4—4 on FIG. 3;

FIG. 5 is a perspective view of one of the power packs for attachment to a side of the fuselage of the aircraft;

FIG. 6 is a partly sectional view of FIG. 5 taken thru a gas generator and its turbine and fan;

FIG. 8 is a partially sectioned view of a modification of the invention utilizing a turboprop;

FIG. 9 is a section taken at 9—9 on FIG. 8; and

FIG. 10 is a top view of the aft portion of the modification of FIG. 8.

Figure 7:
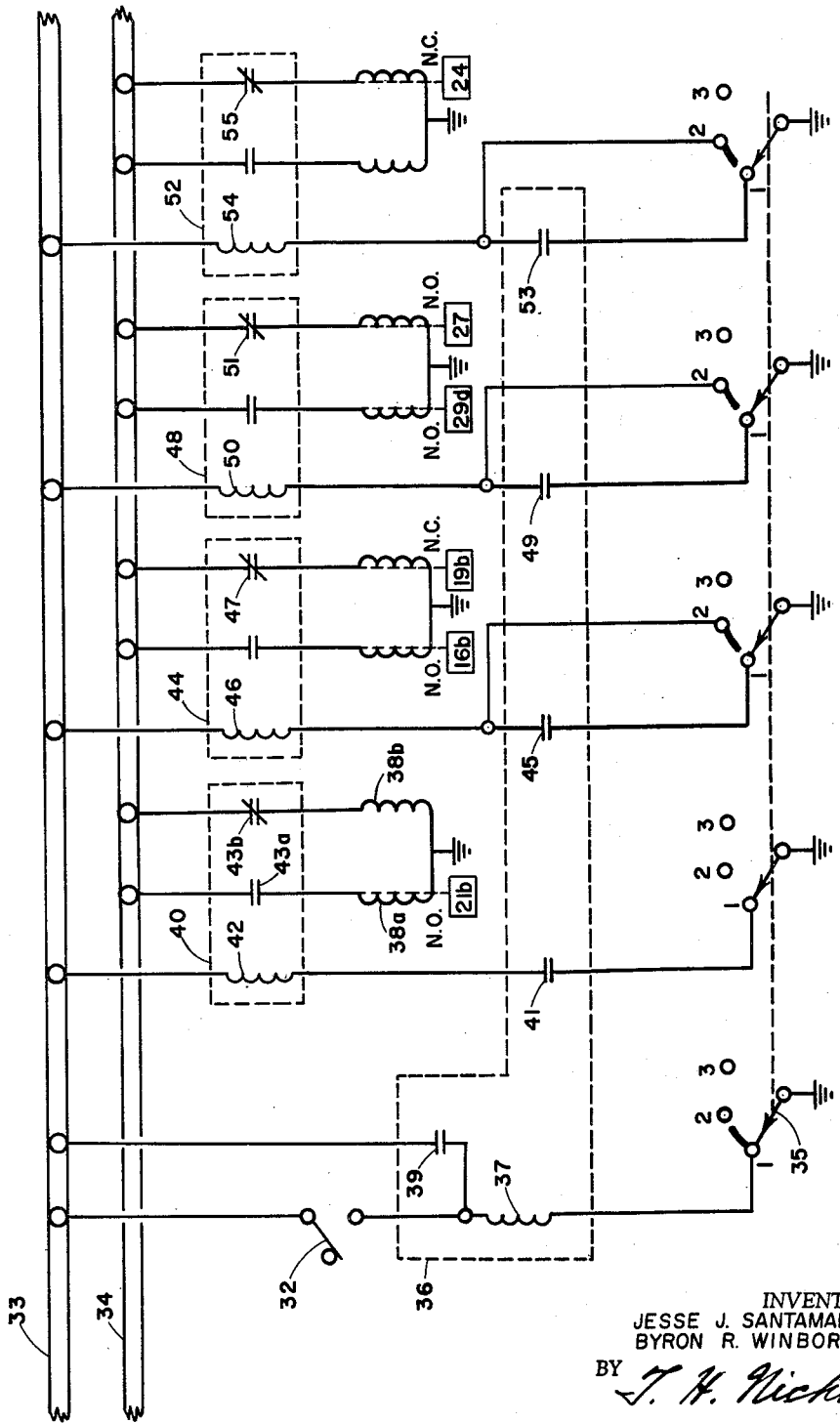
FIG. 7 is an exemplary circuit for the control system.

The invention disclosed herein is not limited in its application to the method and details of construction and arrangement of parts shown and described, since the invention is capable of other embodiments and of being practiced or carried out in various other way. Also it is to be understood that the phraseology or terminology employed herein is for the purpose of description and not of limitation.

The method disclosed prevents the usual high loss of the total thrust in a turbofan or a turboprop propelled aircraft when one power plant fails, such as the usual 25% thrust lost when a four engine aircraft has an engine failure. While this method may be utilized with various types of aircraft as a multi-rotor helicopter, etc., and while various numbers of engines or gas generators may be matched and utilized with a different number of turbines, only its application to multi-turbofan and turboprop-jet propelled aircraft is described herein having four turbofans or turboprops rotated by four turbines, the four turbines being matched to three gas generators with a fourth gas generator provided as disclosed in greater detail hereinafter.

More specifically this method comprises the control and equalization of thrust in an aircraft having a plurality of gas powered turbines and a plurality of gas generators, the number of gas generators being the number of gas generators required to supply all of the turbines plus one generator. The gas generated by the extra generator is utilized to generate direct jet thrust as from a direct jet thrust nozzle while the gas from the other generators is used for rotating the turbines for driving a rotor propulsion means such as turbofans. Upon failure of any gas generator, the direct jets are closed and the total output of the remaining generators powers the turbines for driving the turbofans.

FIG. 1 discloses one propulsion system for carrying out the disclosed method in the form of an exemplary hot gas propulsion and control system for a four hot gas generator turbofan propelled aircraft. This figure shows the system exclusive of the turbine driven fans and the rest of the supporting aircraft structure.

Four jet engines, or hot or cold gas generators 10a, 10b, 10c, and 10d are illustrated in FIG. 1, each engine having a duct 11a, 11b, 11c, and 11d, respectively, attached to the rearward end thereof for receiving the gases and for directing these gases to gas turbines 12a, 12b, 12c, and 12d, respectively, and the tertiary nozzles, FIG. 2, mounted in each duct. Each turbine drives a turbofan for propulsion and for providing lift in the aircraft, as illustrated in FIGS. 5 and 6, wherein jet engine 10a drives a turbine 12a which in turn rotates turbofan 14a thru connecting drive shaft 13a. While the engines are preferably turbo gas generators for generating hot gas, a nuclear gas generator may be used instead for providing the turbine driving hot gases. Likewise, a cold gas generator may be utilized, if so desired.

In the first disclosed exemplar embodiment of FIGS. 1-7, one pair of gas generators, their two turbines, their two driven turbofans, and the accompanying ducts are grouped together in a pod or propulsion pack for mounting on one side of the aircraft as shown in FIG. 5, and the other pair of gas generators and their driven turbines, turbofans, and ducts are grouped to form a second pack for mounting on the other side of the aircraft. While these two groups may be formed as detachable power packs, the components of these groups also may be formed integral with the aircraft.

The pair of generator ducts 11a and 11b, FIGS. 1-3, join with each other intermediate of their ends to form a plenum chamber of an enlarged main duct 15a and the second pair of generator ducts 11c and 11d join with each other intermediate of their ends to form a second enlarged main duct 15b.

FIGS. 1-3 illustrate further that each of the generator ducts 11a-11d has a main duct or fluid flow cut-off valve, such as 16a, 16b, 16c, and 16d, respectively, FIG. 1 particularly, an actuator or servomotor 17a, 17b, 17c, and 17d, respectively, for operating each cut-off valve, overboard by-pass or exhaust ducts 18a, 18b, 18c, and 18d, and overboard exhaust valve 19a, 19b, 19c, and 19d, respectively, for each exhaust ducts, and conventional exhaust valve actuators, or servomotors 20a, 20b, 20c, and 20d. Further, the flow of fuel is controlled to each gas generator by any conventional and suitable means, as fuel flow valves 21a, 21b, 21c, and 21d connected to each of the generators 10a, 10b, 10c, and 10d, respectively. While the exhaust ducts 18a, 18b, 18c, and 18d are shown extending laterally and rearwardly of the gas generators for ease of illustration in FIGS. 1-3, the preferred direction of extension of the exhaust ducts is upwardly and rearwardly as shown in the modified version of FIG. 8.

Enlarged main ducts 15a and 15b, FIG. 1, are interconnected with a cross or transverse duct 22 normally extending transversely of the aircraft fuselage when the main ducts are positioned on opposite sides of the fuselage. While cross duct 22 may connect with the main ducts 15a and 15b at any suitable location such as in the side of the main duct as shown in FIG. 1, FIG. 2 discloses a preferred connection located at openings 23a and 23b in the bottom of the main ducts 15a and 15b, respectively. A suitable valve such as butterfly valve 24 operated by actuator or servomotor 25, FIG. 1, controls cross flow of hot gases between the two main ducts.

A third duct or tertiary duct is provided for each engine duct in the form of annular tertiary ducts leading to variable area nozzles 26a, 26b, 26c, and 26d, FIG. 2, around the periphery of the turbines 12a, 12b, 12c, and 12d, respectively. These tertiary ducts are shown circumscribing the periphery of the turbine gas flow ducts for each turbine, as turbine gas flow duct 89, FIG. 2.

While only one tertiary exhaust duct may be utilized for each power pack, or one tertiary exhaust duct for the entire system, one tertiary duct for each engine duct is illustrated in FIGS. 2 and 3. Conventional valves or controllable two-position nozzles 27a, 27b, 27c, and 27d are attached to the ends of the tertiary ducts for controlling the flow of exhaust gases therefrom. Each tertiary duct nozzle is operated to either the fully opened or fully closed positions by a suitable conventional servomotor, only servomotor 28 being shown in FIG. 1. A cooling duct is provided around the turbines of each pod as cooling duct 88, FIG. 2.

Also, as illustrated in FIGS. 2 and 3, the exhaust gases from the pair of tertiary ducts 26a and 26b are exhausted along with the exhaust gases from the pair of turbines 12a and 12b, respectively, to variable exit nozzle 29a and the exhaust gases from the pair of tertiary ducts 26c and 26d, are exhausted with the exhaust gases from the pair of turbines 12c and 12d, respectively, to variable exit nozzle 29b for added control and propulsion of the aircraft in supplementing the thrust from the four turbofans. The exit size of the nozzles 29a and 29b having variable flaps 29c and 29d, respectively, is varied with conventional servomotors or if so desired, the flaps may be mechanically linked to the upper flaps for controlling and metering the exhaust flow from the nozzles. While servomotor 30b, shown in FIG. 1, varies the size of nozzle 29b by movement of flap 29d, a similar motor 30a, FIG. 6, varies flap 29c of nozzle 29a. With a generator not operating on one side, the cross flow of gases from the other side to the first side to supplement for the loss of gases due to the inoperative generator is increased by a partial closing of the variable exit nozzle on the other side. If the particular aircraft does not require the fine control provided by the above described partial closing, this fine control may be deleted.

While various conventional suitable electro-mechanical transducers such as relays, electric motors, hydraulic actuators, pneumatic actuators, etc. are available for operating the above described valves and nozzles, the illustrated operating means are relays.

A central control box 31, FIG. 1, is provided for housing the relays for each generator.

FIG. 7 discloses the portion of the control box pertaining to one of the four hot gas generators as for the number two generator, 10b, for example. This portion of the control circuit shows the relays for operating the servomotors for positioning the valves pertinent to shutting down and restarting of the number two gas generator 10b. A D.C. bus bar 33 and an A.C. bus bar 34 in the control box supplies power to the various relays illustrated, as the relays 36, 40, 44, 48, and 52.

A microswitch is mounted in each duct 11 or being actuated by the cut-off valve 16 in each duct, but which switches do not hinder movement of the valves.

Microswitch 32 which closes the circuit to the relay 36 comprising a coil 37, or solenoid for operating a contact 39. This relay also closes contacts 41, 45, 49, and 53 for energizing coils 42, 46, 50, and 54, respectively, for actuating their respective normally closed switches 43b, 47, 51, and 55 of the relays 40, 44, 48, and 52, respectively.

An A.C. motor 38a, powered from the A.C. bus bar 34 operates fuel valve 21b in one direction, as to closed position when the motor is operated, and when the A.C. motor 38a is not operated the valve 21b moves to its normally open position, depending on whether relay 40 is energized to open the normally closed switch 43b and close switch 43a or whether the relay is not energized, respectively. Likewise, each of the motors of relays 44, 48, and 52 work similarly. While not shown so connected, the A.C. motor 38b may also operate the valve 21b in the opposite direction if so desired. Over the valves of FIG. 7, the letters "N.O." and "N.C." indicate that the valves are either "normally open" or "normally closed," respectively. If bus bar 34 supplied D.C. current, then relay coils could be substituted for the A.C. motors 38a and 38b.

The manually operated gang selector switch 35 has a rotatable pickoff for each relay whereby all pickoffs are moved in unison to the same contact points #1, #2, or #3 on each relay. The relays may be connected in any desired manner so that they will be operated in the desired sequence.

The control box 31 includes portions of the control circuit for each of remaining three gas generators 10a, 10c and 10d similar to the above disclosed portion for generator 10b.

While each relay 36, 40, 44, 48, and 52 is grounded with the pickoff of the selector switch on #1 contact, current does not flow due to the open contacts 39, 41, 45, 49, and 53, respectively.

With all gas generators operating properly, a limit switch such as a microswitch 32, FIGS. 1 and 7, is open and the gang selector switch 35 is in normal or No. 1 position. When any gas generator loses power below that of the other generator as upon failure of generator 10b, FIG. 1, for example, the reverse flow of hot gases from the other generators causes unbalance of the gas flow and at least partial closing of the main duct valve 16b. The closing movement of valve 16b, FIG. 1, operates momentarily the normally open limit switch 32, FIG. 7, to close the power circuit from the bus bar 33 to the relay 36, which relay, among other operations performed operates the servomotor 17b to completely close cut-off valve 16b. The resultant operation of the coil 37 of the relay 36 closes its normally open contact 39 which in turn closes contacts 41, 45, 49, and 53 for the relays 40, 44, 48, and 52, respectively. With selector switch 35 positioned on contact #1, the contacts 41, 45, 49, and 53 permit energization of coils 42, 46, 50, and 54 to open normally closed switches 43b, 47, 51, and 55 for operating the various actuators and their valves. The momentarily closing of microswitch 32 perpetuates the holding action of coil 37 upon the contacts 41, 45, 49, and 53 as long as selector switch 35 rests on its contact #1. Also, if so desired, a red light (not shown) in the pilot's cockpit is connected in the line with coil 37 of relay 36 for being energized the instant relay 36 is energized and stays on until the relay is deenergized.

Operation of relay 36 and accordingly, the accompanying and simultaneous operation of the relays 40, 44, 48, and 52 simultaneously opens normally closed switches 43b, 47, 51, and 55, respectively, for instantaneous operation of the motors and actuators for operating the respective valves connected to the relays. The closing of relay 40 closes the fuel valve 21b; the closing of relay 44 opens the overboard exhaust valve 19b and closes completely the main duct valve 16b; the closing of relay 48 closes all tertiary duct nozzles 27 and moves flap 29d to nozzle restricted position; and the closing of relay 52 opens cross duct valve 24.

With the valves and nozzles positioned as described above, the gas flow from the remaining three engines or gas generators is divided equally and supplied to the four gas turbines 12a, 12b, 12c, and 12d for continued rotation of the four turbofans 14 (only turbofans 14a and 14b being illustrated in the drawings) for propulsion of the aircraft with little loss of control and power. The loss in total thrust due to the incapacitation of one of the four engines is substantially 12% loss as explained hereinafter.

For restarting the gas generator 10b, for example, when the other three generators are still running, the manually controlled gang selector switch 35 is moved from selector switch contact #1 to contact #2 for deactivating relay 36 for opening contacts 41, 45, 49, and 53, and accordingly relay 40 for flipping switch 43b back to normally closed position for turning on the fuel flow valve 21b. The generator is then restarted and while warming up and coming up to normal operating conditions, its exhaust is bypassed out the open overboard exhaust duct 18b.

Upon the restarted gas generator reaching operating conditions, manual selector switch 35 is moved to selector contact #3 which, as shown in FIG. 7, deactivates relays 44, 48, and 52 for simultaneous operation of the rest of the actuators. Accordingly, relay 44 closes overboard exhaust valve 19b and opens the main duct valve 16b, simultaneously relay 48 opens all tertiary duct nozzles 27 and opens wide the variable nozzle 39d, and simultaneously relay 52 closes the cross duct valve 24. The gases from the four generators are then evenly and equally ducted to the four power turbines, and to the tertiary ducts for normal propulsion of the aircraft, after which gang switch 35 is moved to contact #1, the normal position. Contact #3 is provided for use as a safety contact to insure that all relays are inactive or dead in the static condition and remain so, such as when the aircraft is on the ground.

In showing the loss of total lifting thrust due to one generator out, a typical example is set forth.

As disclosed herein, the total lifting thrust is derived from three sources, from the turbofans, from the gas turbine exhaust, and from the tertiary duct nozzles. Four gas generators or engines produce 30,000 lbs. thrust as shown below:

| | Lbs. |
|---|---|
| 4 fans at 6,000 lbs. each | 24,000 |
| 4 tertiary nozzles at 800 lbs. each | 3,200 |
| 4 turbine exhausts at 700 lbs. each | 2,800 |
| Total thrust | 30,000 |

With loss of one engine, all tertiary nozzles are closed.

Loss=3,200 lbs. or 10.67% of total thrust.

Due to pressure loss in the cross duct, actual loss is substantially 12%.

Greater details of the aircraft of which the above-disclosed propulsion and control system is a part, is disclosed in FIG. 6, wherein the principal elements of one propulsion unit of a pod of the propulsion system is shown.

Turbofan 14a drives air thru a fan flow duct 56, the latter portion of the duct being formed by upper and lower adjustable flaps for lift and propulsion. The upper flaps comprise a forward flap 57 hingedly connected with pin connection 58 to the main structure of the duct 56 and an aft flap 59 hingedly connected to the forward flap with pin connection 60.

A conventional hydraulic actuator 61 controlled by the pilot and pivotally connected between the aircraft structure and the forward flap 57 operates the flap while a second conventional pilot controlled hydraulic actuator 62 is pivotally linked thru an idler link 63 to the aft flap 59 for operating the latter flap.

The lower flaps comprise a forward flap 64 hingedly connected with pin connection 65 to the main structure of duct 56, an intermediate flap 66 pivotally connected with pin connection 67 to the forward flap, and aft flap 68 pivotally connected with pin connection 69 to the intermediate flap. A suitable pilot controlled hydraulic actuator 70 is pivotally secured between the aircraft duct structure and forward flap 64 for rotating the flap about pivot 65. A ground rod 71 pivotally connected between the aircraft duct structure and the intermediate flap 66 controls the pivotal movement of the intermediate flap about its pivot 67 as the forward flap rotates, and a suitable actuator 72 is pivotally connected to the aircraft structure at one end and linked at the other end thru idler links 73 and 74 to aft flap 68 for proper rotation of the aft flap.

In operation of the aircraft, for vertical or hovering flight the pilot operates actuators 61, 62, 70, and 72 to lower the flaps as shown in phantom lines, FIG. 6, for directing the turbofan thrust downwardly, i.e., actuator 61 is contracted and actuators 62, 70, and 72 are extended. For aerodynamic or translational flight, the actuators are operated to the up position illustrated in solid lines, FIG. 6, whereby one component of the thrust propels the aircraft while the other component of thrust provides lift, the operation of the actuators providing a smooth translation from hovering flight to aerodynamic flight, and vice versa.

Spring loaded or closed filler flaps 75 and 76 form smooth fillets over the upper and lower surfaces, respectively, of the joint 65 between forward flap 64 and the aircraft structure, and spring loaded filler flap 77 forms a fillet over the outer surface of the hinge connection 58.

FIG. 8 discloses a modification of the embodiment of the invention of FIGS. 1–7. A portion of the modified aircraft 78 of FIG. 8 includes a pod or wing structure 79 likewise including a dual propulsion system.

FIG. 8 discloses one of the gas generators 80 having a duct 81 and a cross duct 82 for supplying generated gases to a gas turbine 83 which exhausts through nozzle 84. Again, while the gas generator is illustrated as positioned in the upper portion of the pod, it may be positioned on the side or on the lower portion of the pod, if so desired, depending on the particular configuration of vehicle and pod being utilized. The above-mentioned elements are similar to the corresponding elements of the first embodiment of FIGS. 1–7. For purposes of simplicity, the modification of FIG. 8 is for a conventional type aircraft or for a STOL (short takeoff or landing) type of aircraft, either utilizing a turboprop, instead of a VTOL (vertical takeoff or landing) type of aircraft disclosed in FIGS. 1–7. Gas turbine 83 rotates elongated shaft 85 for driving turboprop 86 for propelling the aircraft. A conventional combination split flap-aileron 87, FIG. 10, is mounted on both sides of the exhaust nozzle 84. A conventional reduction gear box 96 is provided in the shaft 85 for reduction of the high velocity of the turbine to a more efficient lower speed prop rotation. Principal differences of the FIG. 8 modification over the embodiment of FIGS. 1–7 are that the gas generators of each pod are separated laterally to a greater extent and the propeller drive shafts are elongated, both features being principally to provide adequate clearance between the propellers. Also, since this modification is shown as a STOL aircraft, the variable fan flow ducts are deleted. All elements other than those mentioned above of the modified aircraft 78 are similar to those of FIGS. 1–7. That is, in FIG. 8, cooling duct 90, tertiary duct 91, tertiary duct variable controllable nozzle 92, turbine gas flow duct 93, flow cut-off valve 94, and overboard discharge valve 95 are similar to the corresponding elements in FIGS. 1–7 of cooling duct 88, tertiary duct 26a, tertiary duct variable controllable nozzle 27a, turbine gas flow duct 89, flow cut-off valve 16a, and overboard discharge valve 19a.

Accordingly a method has been disclosed for maintaining a minimum loss of total thrust and control in turbopropeller or turbofan propelled multi-engine aircraft upon loss of an engine or gas generator comprising immediately equally distributing the gas flow of the remaining generators to all propulsive fans. More than one apparatus is disclosed for carrying out the above method comprising mounting the turbofan or turboprop and their matched power plants in pods or power packs, with the addition of another power plant, interconnecting the main gas ducts with a cross duct, utilizing a variable exhaust nozzle for each pair of exhausting turbines with the VTOL version, and utilizing at least one controllable tertiary exhaust nozzle to provide a novel multi-engine aircraft having a new emergency control system for limiting the loss of total thrust due to one engine failure in a four engine aircraft for example, to substantially 12% instead of the usual 25%.

We claim:

1. A propulsion and control system for an aircraft comprising two interconnected power packs, said packs being adapted to be attached to opposite sides of the aircraft, a plurality of propulsive fans mounted on one of said packs, a turbine connected to each fan, an enlarged duct mounted on said one pack to enclose all turbines, a gas generator connected to said duct for driving each turbine, a plurality of propulsive fans mounted on the second of said power packs, a turbine connected to each of said latter fans, a second enlarged duct mounted on said second pack to enclose all turbines of said second pack, a gas generator connected to said second duct for driving each turbine, first valve means for bypassing the exhaust gas of each generator from its respective turbine upon failure of said one generator to discharge the flow overboard, means for metering the exit flow from any one of said two ducts, a transverse duct interconnecting said two enlarged ducts, valve means for controlling flow through said transverse duct, a plurality of tertiary ducts connected to each enlarged duct for exhausting a portion of the flow therethrough, valve means for closing said tertiary ducts, and sensing means responsive to movement of any one of said first valve means for operating all of said other valve means.

2. A propulsion and control system for an aircraft comprising two similar interconnected power packs, said packs being adapted to be attached to the aircraft and positioned on opposite sides thereof, a pair of propulsion fans mounted on one of said packs, an enlarged duct mounted on said one pack, a pair of turbines mounted in said duct, one of said turbines being connected to one of said fans, the other of said turbines being connected to the other of said fans, a pair of gas generators connected to said duct for driving said turbines, bypass valve means in said duct for discharging overboard the exhaust of each of said generators, variable nozzle means for metering the exit flow from said duct, the second of said similar power packs comprising a pair of propulsive fans, a pair of turbines connected to said latter fans for rotation thereof, and enlarged duct mounted in said second pack, said latter turbines mounted in said latter duct, a pair of gas generators connected to said latter duct for driving said latter turbines, overboard discharge valve means for discharging overboard the exhaust of each of said latter gas generators, variable nozzle means for metering the flow from said latter duct, a transverse duct interconnecting said two enlarged ducts, valve means in said transverse duct for controlling the gas flow of said generators therethrough, a plurality of tertiary ducts connected to each enlarged duct for exhausting a portion of the flow therefrom, valve means for closing said tertiary ducts, sensing means responsive to failure of any one of said generators, and control means responsive to said sensing means for opening the overboard discharge valve means of the inoperative generator, for opening the transverse duct valve means, for closing all of said tertiary duct valve means, and for operating the variable nozzle means of the enlarged duct having the two operative generators for metering the flow therethrough, whereby only a small percentage of the total thrust is lost due to failure of one gas generator.

3. In a propulsion and control system for a turbine powered aircraft, a power pack comprising a plurality of propulsive fan means, turbine means for driving each of said propulsive fan means, an enlarged duct enclosing each of said turbine means, a passageway providing intercommunication between said enlarged ducts and including valve means for opening and closing the passageway, gas generator means for driving each of said turbine means, first valve means associated with each gas generator means for diverting its gas flow from its associated turbine and for discharging the same overboard, exit duct means associated with said enlarged duct for normally exhausting a portion of the gas flowing through the enlarged duct, second valve means for controlling the flow through each of said exit duct means, and sensing means responsive to the closing of any one of said first valve means for operating all of said second valve means to close all of said exit ducts and to operate the valve means in said passageway to its open position to provide intercommunication between the enlarged ducts.

4. In a propulsion and control system for an aircraft a power pack comprising a housing, a plurality of propulsive means mounted in said housing, a turbine connected to each propulsive means, an enlarged duct mounted in said housing having communication with each of said turbines, a gas generator for each turbine connected to said enlarged duct for driving said turbines, first valve means associated with each gas generator adapted to be opened for discharging overboard the exhaust of the associated gas generator during abnormal operation of the same, exit duct means associated with said enlarged duct for normally exhausting overboard a portion of the enlarged duct flow, second valve means for controlling the flow thru said exit duct means, and sensing means responsive to the opening of any one of said first valve means for operating said second valve means to close said exit duct means whereby the total exhaust of the normally operating gas generators is distributed through said enlarged duct to all of said turbines.

5. A propulsion and control system for an aircraft comprising two interconnected power packs, said packs being adapted to be attached to opposite sides of the aircraft, each of said packs comprising propulsive means, turbine means for driving said propulsive means, an enlarged duct means enclosing said turbine means, and gas generator means, said enlarged duct means receiving the gases from said generator means for driving said turbine means, first valve means associated with each gas generator means for discharging overboard the exhaust of its associated gas generator means, exit duct means associated with each enlarged duct means for exhausting a portion of the flow from each of said enlarged duct means, second valve means for controlling the flow thru each of said exit duct means, transverse duct means communicating between the enlarged duct means of one power pack and the enlarged duct means of the other power pack, third valve means for controlling flow thru said transverse duct means, and sensing means responsive to the movement of any one of said first valve means for operating all of said second and third valve means to close all of said exit duct means and to open said transverse duct means.

6. A propulsion and control system for an aircraft comprising, two interconnected power packs, each of said power packs comprising, a housing, a plurality of propulsive fan means mounted in said housing, a turbine connected to each propulsive fan means, an enlarged duct mounted on said housing to enclose the turbines, gas generators for each turbine connected to said duct for driving said turbines, and first valve means for each of said gas generators for directing and discharging overboard the exhaust of the gas generator, transverse duct means providing a passageway between said enlarged duct of one power pack and said enlarged duct of the second power pack, second valve means for controlling flow thru said transverse duct means, tertiary duct means for each enlarged duct for exhausting a portion of the enlarged duct flow, third valve means for controlling the flow thru said tertiary duct means, and sensing means responsive to the movement of any one said first valve means for operating all of said second and third valve means to open said transverse duct means and to close all of said tertiary duct means.

7. A propulsion and control system for an aircraft comprising, two interconnected power packs, each pack including a plurality of propulsive means, turbine means for driving each propulsive means, an enlarged duct means for enclosing the turbine means, gas generating means for driving each turbine means, first valve means associated with each gas generating means for bypassing overboard the exhaust of its associated gas generating means, tertiary duct means for exhausting a portion of the enlarged duct flow, and second valve means for controlling the flow thru said tertiary duct means, transverse duct means providing communication between said enlarged ducts of the two power packs, third valve means for controlling flow thru said transverse duct means, and sensing means responsive to the movement of any one of said first valve means for operating all of said second and third valve means to close all of said tertiary duct means and to open said transverse duct means.

8. The system as recited in claim 7, including fourth valve means associated with each gas generator and responsive to the movement of said first valve means for cutting off exhaust flow from said associated gas generator means to the turbine driven by said associated gas generator means.

9. The system as recited in claim 8, wherein said fourth valve means for cutting off flow from said associated generator includes spring biasing means urging said fourth valve means to its closed position, said fourth valve means normally being maintained open against said spring biasing means by exhaust flow from said associated generator.

10. In a system as recited in claim 9, said sensing means also comprising detecting means actuated by operation of said fourth valve means for detecting failure of said one gas generator.

References Cited in the file of this patent

UNITED STATES PATENTS

| | | |
|---|---|---|
| 2,168,726 | Whittle | Aug. 8, 1939 |
| 2,865,176 | Skellern | Dec. 23, 1958 |